United States Patent
Bageshwar et al.

(10) Patent No.: US 11,835,341 B2
(45) Date of Patent: Dec. 5, 2023

(54) INTEGRITY MONITORING OF VEHICLE KINEMATIC STATES USING MAP-BASED, VISION NAVIGATION SYSTEMS

(71) Applicant: Honeywell International Inc., Charlotte, NC (US)

(72) Inventors: Vibhor L Bageshwar, Rosemount, MN (US); Michael Ray Elgersma, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 257 days.

(21) Appl. No.: 17/380,916

(22) Filed: Jul. 20, 2021

(65) Prior Publication Data

US 2023/0036411 A1   Feb. 2, 2023

(51) Int. Cl.
G01C 21/00     (2006.01)
G06T 7/73      (2017.01)
G06T 7/246     (2017.01)

(52) U.S. Cl.
CPC ............ G01C 21/005 (2013.01); G06T 7/248 (2017.01); G06T 7/74 (2017.01); *G06T 2207/10032* (2013.01); *G06T 2207/30181* (2013.01)

(58) Field of Classification Search
CPC ...... G01C 21/005; G01C 21/28; G01C 21/20; G06T 7/248; G06T 7/74;
(Continued)

(56) References Cited

U.S. PATENT DOCUMENTS 9,104,752 B2 *   8/2015  Ingvalson ................ G06F 9/54
9,274,526 B2     3/2016  Murai et al.
(Continued)

FOREIGN PATENT DOCUMENTS

CN       111595333 A       8/2020
KR    20170122935 A   *  11/2017

OTHER PUBLICATIONS

Georges, Hassana Magigary et al. "Hybrid Cooperative Vehicle Positioning Using Distributed Randomized Sigma Point Belief Propagation on Non-Gaussian Noise Distribution", IEEE Sensors Journal, vol. 16, No. 21, Nov. 1, 2016, pp. 7803-7813 (Year: 2016).*
(Continued)

*Primary Examiner* — James M McPherson
*Assistant Examiner* — Kyle J Kingsland
(74) *Attorney, Agent, or Firm* — Fogg & Powers LLC

(57) ABSTRACT

A system for integrity monitoring comprises a processor onboard a vehicle, a terrain map database, vision sensors, and inertial sensors. Each vision sensor has an overlapping FOV with at least one other vision sensor. The processor performs integrity monitoring of kinematic states of the vehicle, and comprises a plurality of first level filter sets, each including multiple position PDF filters. A consistency monitor is coupled to each first level filter set. Second level filter sets, each including multiple position PDF filters and a navigation filter, are coupled to the consistency monitor, the map database, the vision sensors, and the inertial sensors. Consistency check modules are each coupled to a respective second level filter set. A third level fusion filter is coupled to each of the consistency check modules. An integrity monitor is coupled to the fusion filter and assures integrity of a final estimate of the vehicle kinematic state statistics.

20 Claims, 10 Drawing Sheets

(58) Field of Classification Search
CPC .......... G06T 2207/10032; G06T 2207/30181; B60W 2420/42; B60W 2420/52; B60W 2556/40; B60W 2556/50; B60W 50/0205
See application file for complete search history.

(56) References Cited

U.S. PATENT DOCUMENTS

| | | | |
|---|---|---|---|
| 9,952,049 | B2 | 4/2018 | Zhang et al. |
| 10,473,466 | B2 * | 11/2019 | Dunik ............... G01C 21/1652 |
| 2017/0350973 | A1 | 12/2017 | Dunik et al. |
| 2019/0234745 | A1 | 8/2019 | Lee |
| 2020/0001886 | A1 | 1/2020 | Kana et al. |
| 2020/0011668 | A1 | 1/2020 | Derhy et al. |
| 2021/0156689 | A1 | 5/2021 | Tiana et al. |

OTHER PUBLICATIONS

Nordlund, Per-Johan, "Sequential Monte Carlo Filters and Integrated Navigation", Linköping Studies in Science and Technology Thesis No. 945, Division of Automatic Control Department of Electrical Engineering, Linköpings universitet, SE-581 8:3 Linkoping, Sweden, 2002 (Year: 2002).*
European Patent Office, "Extended European Search Report", from EP Application No. 22183914.5, from Foreign Counterpart to U.S. Appl. No. 17/380,916, filed Jan. 9, 2023, pp. 1 through 5, Published: EP.
Ahlbrecht et al., "High Integrity Positioning: Lessons from the Aviation Industry", Dynamic Positioning Conference, Oct. 2010, pp. 1 through 16, Honeywell Aerospace.
Bageshwar, Vibhor L. et al., "Integrity Monitoring of Odometry Measurements Within a Navigation System", U.S. Appl. No. 17/156,203, filed Jan. 22, 2021, pp. 1 through 50, Published: US.
Brenner, "Integrated GPS/Inertial Fault Detection Availability", Journal of The Institute of Navigation, 1996, pp. 111 through 130, vol. 43, No. 2, Navigation.
Calhoun et al., "Integrity Determination for a Vision Based Precision Relative Navigation System", 2016, pp. 294 through 304, IEEE.
Mario et al., "Integrity Monitoring of Vision-Based Automotive Lane Detection Methods", 23rd International Technical Meeting of the Satellite Division of The Institute of Navigation, Sep. 2010, pp. 245 through 255, Portland, OR.
Vanderwerf, "FDE Using Multiple Integrated GPS/Inertial Kalman Filters in the Presence of Temporally and Spatially Ionospheric Errors", ION GPS, Sep. 2001, pp. 2676 through 2685, Salt Lake City, UT.
Zhu et al., "GNSS Position Integrity in Urban Environments: A Review of Literature", IEEE Transactions on Intelligent Transportation Systems, May 1, 2018, pp. 1 through 19, HAL.
Elgersma Michael R. et al., "Method and System for Planning Vehicle Trajectories by Enhancing En Route Navigation Performance", U.S. Appl. No. 17/350,959, filed Jun. 17, 2021, pp. 1 through 35, Published: US.
Elgersma Michael R. et al., "Position Probability Density Function Filter to Determine Real-Time Measurement Errors for Map Based, Vision Navigation Systems", U.S. Appl. No. 17/340,921, filed Jun. 7, 2021, pp. 1 through 52, Published: US.
Bageshwar Vibhor L. et al., "Integrity of Range Measurements", U.S. Appl. No. 17/237,841, filed Apr. 22, 2021, pp. 1 through 44, Published: US.

* cited by examiner

INTEGRITY MONITORING OF VEHICLE KINEMATIC STATES USING MAP-BASED, VISION NAVIGATION SYSTEMS

BACKGROUND

A typical method of vehicle navigation in Global Navigation Satellite System (GNSS) denied environments is to use map-based, vision navigation systems to estimate the kinematic states, including position and angular orientation, of the vehicle. Map-based, vision navigation systems typically use vision sensors located on the vehicle to collect images of the ground and correlate the images with pre-existing maps to navigate. The correlated images provide relative position and angular orientation measurements of the vision sensor, and therefore the vehicle, relative to the map. These measurements are fused by a navigation filter, typically a Bayesian filter, with measurements of other sensors to estimate the vehicle's position and angular orientation relative to the map. If the navigation system is given the transformations of the map's position and angular orientation relative to a known reference frame, then the filter's estimates of the vehicle's kinematic state statistics can be resolved in the known reference frame.

In safety critical navigation applications, the integrity of the sensor set measurements and the estimated vehicle kinematic state statistics must be continuously monitored to satisfy the navigation system's safety requirements. Monitoring the integrity of the navigation system is achieved by exploiting redundancy in the sensors and redundancy in the sensor measurements, and by using probabilistic algorithms to continually estimate the navigation system's estimation errors to detect sensor faults, to detect faults in the sensor measurements, and to detect estimated vehicle kinematic state statistics that exceed integrity requirements.

A hybrid solution separation technique has been developed for use as a method to monitor the integrity of a navigation system. However, in safety critical navigation systems with sensor sets that include vision based sensors, there is a need for further appropriate fault detection and integrity monitoring algorithms.

SUMMARY

A system for integrity monitoring comprises a processor onboard a vehicle, a terrain map database onboard the vehicle and operatively coupled to the processor, and a plurality of vision sensors onboard the vehicle and operatively coupled to the processor. Each of the vision sensors have an overlapping field of view (FOV) with at least one of the other vision sensors. In addition, one or more inertial sensors onboard the vehicle are operatively coupled to the processor. The processor includes a processing unit operative to perform integrity monitoring of kinematic states of the vehicle. The processing unit comprises a plurality of first level filter sets, wherein each first level filter set includes multiple position probability density function (PDF) filters. Each first level filter set is operative to: receive image data of the overlapping FOV from a respective vision sensor of the plurality of vision sensors, the image data corresponding to one or more terrain images of a given area; receive map data from the terrain map database, the map data corresponding to one or more terrain maps of the given area; identify one or more terrain features in the image data of the overlapping FOV and in the map data; and estimate a position PDF for the vehicle using the one or more terrain features. A first level consistency monitor is operatively coupled to each of the first level filter sets. The first level consistency monitor is operative to: receive the estimated position PDF from each of the first level filter sets; and determine a set of features, within the overlapping FOV of each visual sensor, which assure that the estimated position PDFs are statistically consistent with each other.

The processing unit further comprises a plurality of second level filter sets, wherein each second level filter set includes multiple position PDF filters and a navigation filter. Each second level filter set is operative to: receive, from the consistency monitor, the estimated position PDFs that are statistically consistent with each other; receive the map data from the terrain map database; receive inertial data from the one or more inertial sensors; receive image data from the respective vision sensor that includes one or more terrain features not in the overlapping FOV; and estimate kinematic state statistics for the vehicle based on the received data and the position PDFs that are statistically consistent. A plurality of second level consistency check modules are each operatively coupled to a respective one of the second level filter sets. Each second level consistency check module is operative to: receive the estimated kinematic state statistics from the respective one of the second level filter sets; and assure consistency of the estimated kinematic state statistics. A third level fusion filter is operatively coupled to each of the second level consistency check modules. The third level fusion filter is operative to combine the estimated kinematic state statistics from each of the second level consistency check modules; and compute a final estimate of the kinematic state statistics of the vehicle. A third level integrity monitor is operatively coupled to the third level fusion filter. The third level integrity monitor is operative to assure integrity of the final estimate of the kinematic state statistics; and compute protection levels for kinematic states of the vehicle.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An approach for integrity monitoring of vehicle kinematic state statistics using map-based, vision navigation systems is described herein. The present approach assures the integrity of map-based, vision navigation systems that fuse measurements from a set of vision based sensors. The techniques described herein assure the integrity of vision sensor measurements and the navigation systems that use these measurements.

In the present approach, the integrity of navigation measurements from vision sensors is assured by using a priori maps of a vehicle's operating environment with applications of solution separation and sensor measurement clustering. This methodology provides capabilities to assure the integrity of map-based, vision navigation systems for various vehicle navigation applications including air transport, missiles and munitions, air taxis, and ground vehicles, especially in Global Navigation Satellite System (GNSS) denied environments.

The use of vision sensors as aiding sources for navigation systems is important for operation in GNSS denied environments, and for operation close to the ground where GNSS is subject to large, changing multipath errors. The use of vision sensors as aiding sources is also important where navigation relative to features in the environment is important for an application, such as for air taxis, surface navigation for commercial aircraft and business jets, and Unmanned Aircraft Systems (UAS) operation in terminal airspace and close to building infrastructure.

The present systems and methods provides the capability to assure the integrity of measurement probability density functions (PDFs) extracted from any vision based sensor correlated with a map. The filter and integrity monitoring architecture uses a feature clustering strategy to assure the integrity of the vision measurements.

Faulty measurements can arise from incorrect feature matches between the vision sensor measurements and the map. The present methods provide the capability to detect and isolate faults in feature extraction from any of the vision sensors. The methods can detect erroneous navigation related measurements extracted from stationary feature measurements using the output of solution separation filters and integrity monitoring algorithms. In addition, the present approach has the capability to provide uncertainty estimates in the form of horizontal and vertical protection limits for the position estimated by the navigation system.

Further details of the present systems and methods are described as follows and with reference to the drawings.

Figure 1:
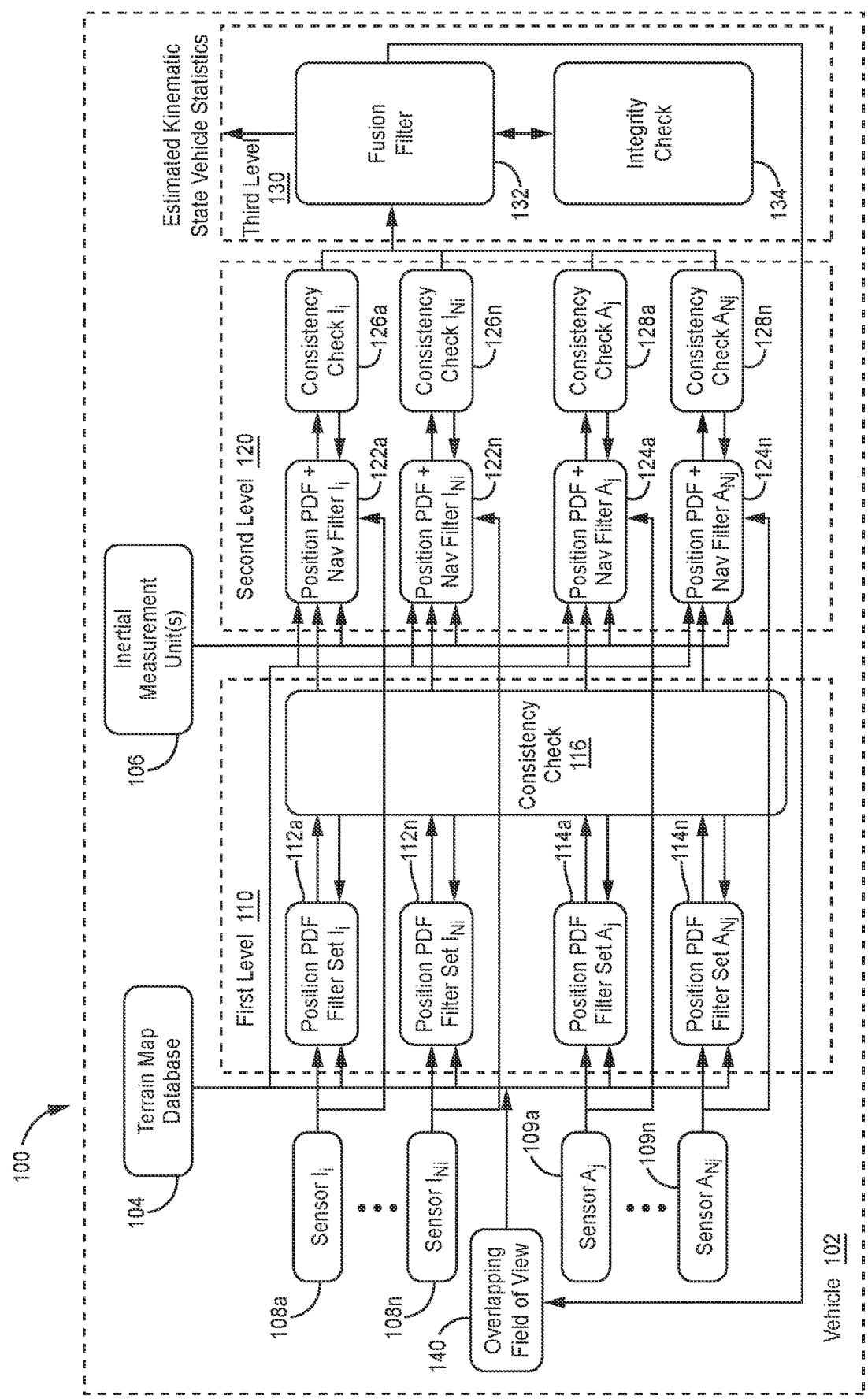
FIG. 1 is a block diagram of a navigation system architecture according to an exemplary embodiment, which is implemented for integrity monitoring of vehicle kinematic state statistics.

FIG. 1 illustrates an architecture of a navigation system 100 according to an exemplary embodiment, which is implemented for integrity monitoring of the vehicle's kinematic state statistics. The navigation system 100 generally includes one or more processors onboard a vehicle 102, an onboard terrain map database 104 operatively coupled to the processor(s), and one or more inertial sensors, such as at least one onboard inertial measurement unit (IMU) 106, operatively coupled to the processor(s). In addition, a plurality of onboard vision sensors 108, 109 are mounted on vehicle 102 and are operatively coupled to the processor(s). Each of the vision sensors is configured to have an overlapping field of view (FOV) with at least one of the other vision sensors.

The navigation system 100 is implemented with three levels of filters, with corresponding integrity monitors in each level, which are implemented in the one or more processors. As shown in FIG. 1, navigation system 100 includes a first level 110 with filters and an integrity monitor, a second level 120 of filters and corresponding integrity monitors, and a third level 130 of filters and integrity monitors. These levels of filters and corresponding integrity monitors are described in further detail hereafter.

The vision sensors can be divided into different categories of sensors (e.g., sensor I, . . . , A). For example, the different categories of vision sensors can include electro-optical (EO) cameras, infra-red (IR) cameras, light detection and ranging (LiDAR) sensors, radar sensors, or the like. In the example of FIG. 1, one category of sensors includes a set of vision sensors $108a$-$108n$ (sensor $I_i \exists i=1, N_i$), such as multiple EO cameras. Another category of sensors includes a set of vision sensors $109a$-$109n$ (sensor $A_j \exists j=1, N_j$), such as multiple LiDAR sensors. Although not shown, one or more additional categories of vision sensors may be implemented in navigation system 100.

In one embodiment of navigation system 100, first level 110 includes a plurality of first level filter sets 112, 114, wherein each first level filter set is operatively coupled to a respective one of the vision sensors, and terrain map database 104. Each first level filter set includes multiple position probability density function (PDF) filters (position PDF filter set). Each first level filter set is operative to receive image data of the overlapping FOV from a respective vision sensor. The image data corresponds to one or more terrain images of a given area over which vehicle 102 is traversing.

For example, as shown in FIG. 1, a filter set $112a$ (position PDF filter set $I_i$) is configured to receive image data from vision sensor $108a$ (sensor $I_i$), and a filter set $112n$ (position PDF filter set $I_{Ni}$) is configured to receive image data from sensor $108n$ (sensor $I_{Ni}$). Likewise, a filter set $114a$ (position PDF filter set $A_j$) is configured to receive image data from vision sensor $109a$ (sensor $A_j$), and a filter set $114n$ (position PDF filter set $A_{Nj}$) is configured to receive image data from sensor $109n$ (sensor $A_{Nj}$). Although not shown, one or more additional first level filter sets may be implemented in navigation system 100 when additional categories of vision sensors are employed.

Each first level filter set is also operative to receive map data from terrain map database 106, with the map data corresponding to one or more terrain maps of the given area. Each first level filter set identifies terrain features in the image data of the overlapping FOV and in the map data, and estimates a position PDF for vehicle 102 using the terrain features. The first level filter sets operate only on features in the overlapping FOV, and output the position PDFs of the vehicle relative to the map from each sensor.

The first level 110 of navigation system 100 also includes a consistency check monitor 116 operatively coupled to each of the first level filter sets. The consistency check monitor 116 is operative to receive the estimated position PDFs from each of the first level filter sets, and operates on all the outputs (position PDFs) from the first level filter sets simultaneously. The consistency check monitor 116 uses features within the overlapping FOV of each visual sensor to assure that the estimated position PDFs by each filter set are statistically consistent. Further details related to the operation of the first level consistency check monitor are described hereafter.

The second level 120 of navigation system 100 includes a plurality of second level filter sets 122, 124, wherein each second level filter set is coupled to a respective one of the vision sensors, terrain map database 104, IMU(s) 106, and consistency check monitor 116. Each of the second level filter sets includes multiple position PDF filters and a navigation filter. The second level filter sets operate on all features from the respective vision sensor including the features located in the overlapping sensor FOVs. Each second level filter set is operative to receive from consistency check monitor 116 the estimated position PDFs that are statistically consistent with each other.

For example, a filter set 122a (position PDF plus navigation filters $I_j$) and a filter set 122n (position PDF plus navigation filters $I_{Nj}$) are configured to receive from consistency check monitor 116 the estimated position PDFs that are statistically consistent with each other. Likewise, a filter set 124a (position PDF plus navigation filters $A_j$) and a filter set 124n (position PDF plus navigation filters $A_{Nj}$) are configured to receive from consistency check monitor 116 the estimated position PDFs that are statistically consistent with each other.

Each second level filter set is also operative to receive map data from terrain map database 104, and inertial data from IMU(s) 106 such as through a strapdown inertial navigation system (INS). Each second level filter set is also operative to receive image data from the respective vision sensor that includes terrain features not in the overlapping FOV. For example, filter set 122a and filter set 122n are configured to receive nonoverlapping FOV image data respectively from vision sensor 108a and vison sensor 108n. Likewise, filter set 124a and filter set 124n are configured to receive nonoverlapping FOV image data respectively from vision sensor 109a and vison sensor 109n.

Each second level filter set is operative to estimate kinematic state statistics for vehicle 102 from the respective vision sensor, based on the received data and the position PDFs that are statistically consistent. Although not shown, one or more additional second level filter sets may be implemented in navigation system 100 when additional categories of vision sensors are employed.

As apparent from the above description of navigation system 100, in first level 110 and second level 120, each vision sensor has an assigned first level filter set and second level filter set. Thus, each filter set operates on measurements from a single vision sensor.

The second level 120 of navigation system 100 also includes a plurality of consistency check modules 126, 128 that are each operatively coupled to a respective one of the second level filter sets 122, 124. Each consistency check module is operative to receive the estimated kinematic state statistics from the respective one of the second level filter sets, and to assure consistency of the kinematic state statistics estimated by each second level filter set.

For example, as illustrated in FIG. 1, a consistency check module 126a is operative to receive the estimated kinematic state statistics from second level filter set 122a, and a consistency check module 126n is operative to receive the estimated kinematic state statistics from second level filter set 122n. Likewise, a consistency check module 128a is operative to receive the estimated kinematic state statistics from second level filter set 124a, and a consistency check module 128n is operative to receive the estimated kinematic state statistics from second level filter set 124n. Although not shown, one or more additional consistency check modules may be implemented in navigation system 100 when additional second level filter sets are employed.

The third level 130 of navigation system 100 includes a fusion filter 132 that is operatively coupled to each of the consistency check modules in second level 120. The fusion filter 132 is operative to receive and combine the estimated kinematic state statistics from each of consistency check modules 126, 128. The fusion filter 132 computes a final estimate of the kinematic state vehicle statistics from all of the sensors, which is then output to other vehicle systems for use by vehicle 102. The fusion filter 132 is also coupled in a feedback loop to an overlapping FOV input 140 that is fed into first level filter sets 112, 114.

The third level 130 also includes an integrity check monitor 134 is operatively coupled to fusion filter 132. The integrity check monitor 134 is operative to assure integrity of the final estimates of the vehicle's kinematic state statistics by operating on all outputs from the second level filter sets, and providing a single estimate of all vehicle kinematic state statistics from all second level filter set (assured) outputs. The integrity check monitor 134 also computes protection levels for the kinematic states of the vehicle.

Further details of the present navigation system and methods for integrity monitoring are described as follows.

Sensors and Features

As described previously, the vision sensors in the present navigation system (e.g., system 100) are divided into categories, such as EO cameras, IR cameras, LiDAR sensors, radar sensors, or the like. Standard lever arms can be used to provide proper mounting position and angular orientation of the vision sensors on a vehicle such as an aircraft. The vision sensors are mounted on the vehicle to have overlapping FOVs of the ground over which the vehicle will be traversing.

The "features" detected by the vision sensors can be landmark features, terrain features, or edges associated with contrasting physical differences in the terrain. Common edges include shorelines, sharp rock features, roads, buildings, and other distinctive terrain features. Such edge features can be identified using conventionally known edge detection techniques, such as Canny edge detection algorithms.

As used herein, for each sensor k, the detected features, $S_k$, are divided into two subsets:
 subset O: features within overlapping sensor FOV;
 subset $B_k$: features measured by sensor k not in subset O;

where: $S_k = O \cup B_k \; \forall k$.

In addition, for all sensors:
 subset O: features within overlapping sensor FOV;
 subset B: all features measured by sensors not in subset O;
 where:

$S = O \cup B;$ $B = B_{I1} \cup \ldots \cup B_{INi} \cup \ldots \cup B_{A1} \cup \ldots \cup B_{ANj}.$ The present approach identifies features in the overlapping sensor FOVs 140, which are included in subset O. In particular, for each sensor, the present method predicts ground projections of the sensor FOVs. This is done using the estimated vehicle kinematic state statistics from the third level fusion filter 132 and a map from terrain map database 104 (FIG. 1). The method selects feature locations using the map and ground projections of the sensor FOVs. The method then selects a subset of features within the overlapping sensor FOVs, which is defined as subset O. The features from sensors not in the overlapping sensor FOV are assigned to subset $B_k$. The feature subset O is then provided to the first level filter sets 112, 114 (FIG. 1).

First Level Filter Sets

The first level filter sets in the present navigation system (e.g., system 100) are operative to estimate position PDFs using only the features observed by multiple vision sensors in the overlapping FOVs (feature subset O, with $N_O$ features). Each vision sensor is assigned to its own first level filter set, independent of all other vision sensors and their corresponding measurements. In addition, each position PDF filter set includes non-linear filters, such as Fokker-Planck filters, which estimate the position PDFs using the feature subset O.

Figure 2:
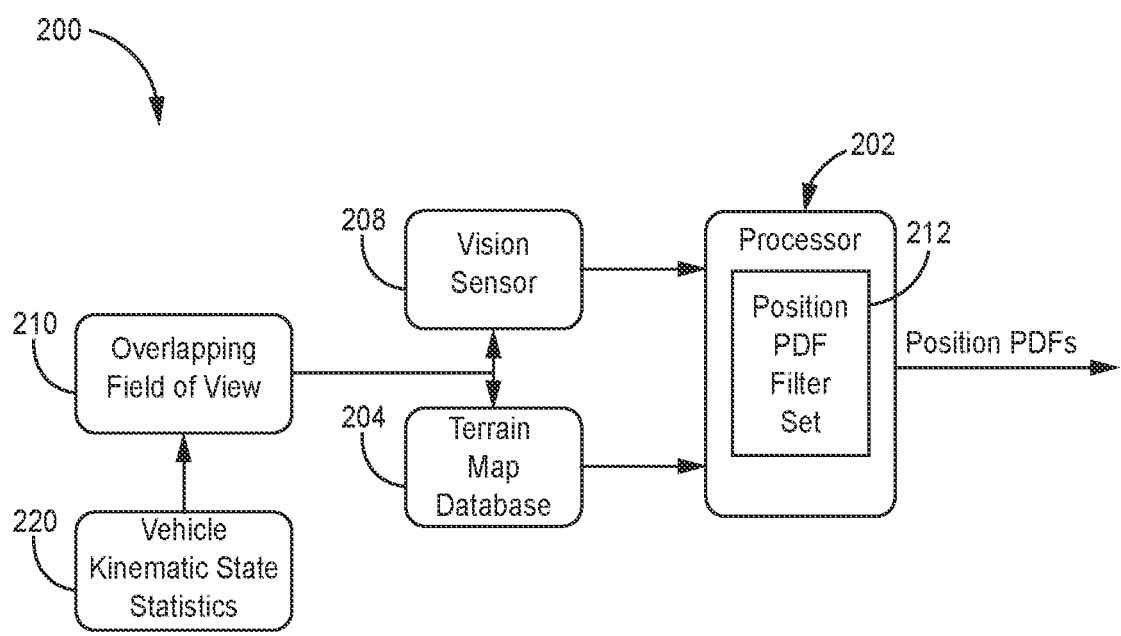
FIG. 2 is a block diagram of a portion of a navigation system, which shows an exemplary implementation of a first level filter set, such as used in the navigation system architecture of FIG. 1.

FIG. 2 is a block diagram of a portion of a navigation system 200, which shows an exemplary implementation of one of the first level filter sets described above. The navigation system 200 include a processor 202 onboard a vehicle such as an aircraft, an onboard terrain map database 204 operatively coupled to processor 202, and a vision sensor 208 (one of multiple sensors) mounted on the vehicle and operatively coupled to processor 202. A position PDF filter set 212 is hosted in processor 202.

The position PDF filter set 212 is operative to receive image data from vision sensor 208 through processor 202. The image data corresponds to terrain images captured by vision sensor 208 of a given area over which the vehicle traverses. The position PDF filter set 212 is also operative to receive map data from map database 204 through processor 202, with the map data corresponding a terrain map of the given area.

The position PDF filter set 212 is operative to generate statistics of the position and angular orientation of the vehicle, based on correlation of the image data and map data, using features from an overlapping FOV input 210 (feature subset O, with $N_O$ features). Prior computed vehicle kinematic state statistics 220 are also fed back into overlapping FOV input 210 for use in identifying features in the overlapping sensor FOVs, which are included in subset O. The feature subset O is then provided to the position PDF filter set 212. The statistics include a mean and variance of the image/map correlation where the variance comprises real-time measurement errors of the position and angular orientation.

The statistics generated by position PDF filter set 212 are output as position PDFs. Non-linear filters such as Fokker-Planck filters in position PDF filter set 212 are used to estimate the position PDFs from a convolution of PDFs of the image features and PDFs of the map features. Further details on computing position PDFs and the use of non-linear filters can be found in the U.S. patent application titled POSITION PROBABILITY DENSITY FUNCTION FILTER TO DETERMINE REAL-TIME MEASUREMENT ERRORS FOR MAP BASED, VISION NAVIGATION SYSTEMS, U.S. appliccation Ser. No. 17/340,921, now U.S. Pat. No. 11,609,093, the contents of which is hereby incorporated by reference in its entirety.

Figure 3:
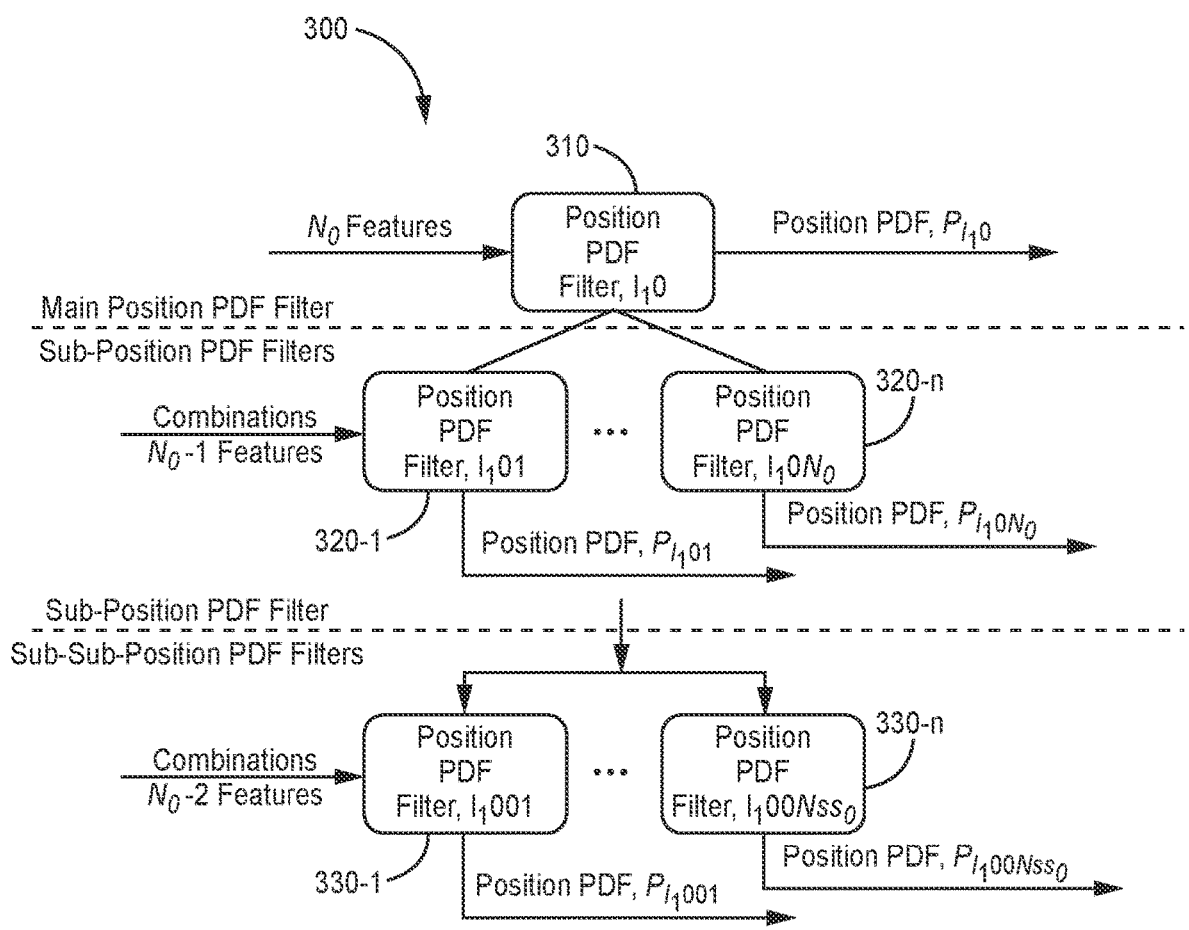
FIG. 3 is a block diagram of an example configuration for a first level filter set, implemented as a position probability density function (PDF) filter set.

FIG. 3 is a block diagram of an example configuration for a first level filter set 300, which can be implemented in position PDF filter set 212, for example. As shown in FIG. 3, first level filter set 300 includes a main position PDF filter, multiple sub-position PDF filters of the main PDF filter, and multiple sub-sub-position PDF filters from each of the sub-position PDF filters.

For example, the main position PDF filter includes a position PDF filter, $I_1 0$ (block 310), which is configured to receive $N_O$ features, and to output a position PDF, $P_{I_1 0}$ at a single time epoch. The sub-position PDF filters include, for example, a position PDF filter, $I_1 01$ (block 320-1), and one or more additional filters including a position PDF filter, $I_1 0 N_O$ (block 320-$n$). Each sub-position PDF filter is configured to receive combinations of $N_O-1$ features. The position PDF filter, $I_1 01$, is configured to output position PDF, $P_{I_1 01}$ at a single time epoch. The position PDF filter, $I_1 0 N_O$, is configured to output position PDF, P at a single time epoch. The sub-sub-position PDF filters include, for example, a position PDF filter, $I_1 001$ (block 330-1) and one or more additional filters including a position PDF filter, $I_1 00 Nss_O$ (block 330-$n$). Each sub-sub-position PDF filter is configured to receive combinations of $N_O-2$ features. The position PDF filter, $I_1 001$, is configured to output position PDF, $P_{I_1 001}$ at a single time epoch. The position PDF filter, $I_1 00 Nss_O$, is configured to output position PDF, $P_{I_1 00 Nss_O}$ at a single time epoch.

First Level Consistency Monitor

The first level consistency monitor (e.g., consistency check monitor 116, FIG. 1) uses the position PDFs estimated by the first level filter sets to assure that the position PDFs computed by each filter in the first level filter sets are statistically equivalent. In particular, the first level consistency monitor finds the set of features from subset O that can be verified as leading to statistically equivalent position PDFs by all first level filter sets, within subset $O_1$, and features $N_{O1}$.

In finding PDFs that are statistically equivalent, the first level consistency monitor uses the Kolmogorov-Smirnov test to compare the cumulative distribution functions (CDFs) of two arbitrary PDFs. This is done by comparing the position PDF computed by each filter using all features in subset O. If statistically equivalent, then the present method proceeds to the second level filter sets (when features in subset O=features in subset $O_1$). If not statistically equivalent, then the method finds the position PDF computed within each filter set that is statistically equivalent by, in some sense, sequentially dropping one feature from the remaining set, and comparing the resulting position PDFs to determine their statistical consistency (features in subset $O_1$ features in subset O).

The first level consistency monitor provides a consistency check of the position PDFs from the first level position PDF filter sets, with the main position PDF filters operating on all features, and the sub-position PDF filters operating on a subset of features. In general, the consistency check computes a discriminator, D, using the Kolmogorov-Smirnov test, and uses a user-selected threshold, T. The consistency check then determines whether D≤T.

The Kolmogorov-Smirnov test defines the cumulative distribution function (CDF), F, of a one-dimensional random variable, x, with PDF, P, as (no assumptions on the statistics of x):

$$F(a) = P(x \leq a)$$

$$F_n(a) = \frac{1}{n} \sum_i \|_i(x_i < a); \; CDF \text{ of } n \text{ observed data points}$$

$$\| \equiv \begin{cases} 1 : \text{argument is true} \\ 0 : \text{argument is false} \end{cases}$$

Given the CDFs of two PDFs, $F^1(x)$ and $F^2(x)$, a statistic can be computed that compares the point of maximum discrepancy as:

$$D_n = \max_x |F_n^1(x) - F_n^2(x)|$$

$$D_n < T$$

If $D_n$ is close to 0, then the distributions have more overlap. If $D_n$ is close to 1, then the distributions have less overlap. The Kolmogorov-Smirnov test can be extended to multidimensional random variables with a number of complexities.

Figure 4A:
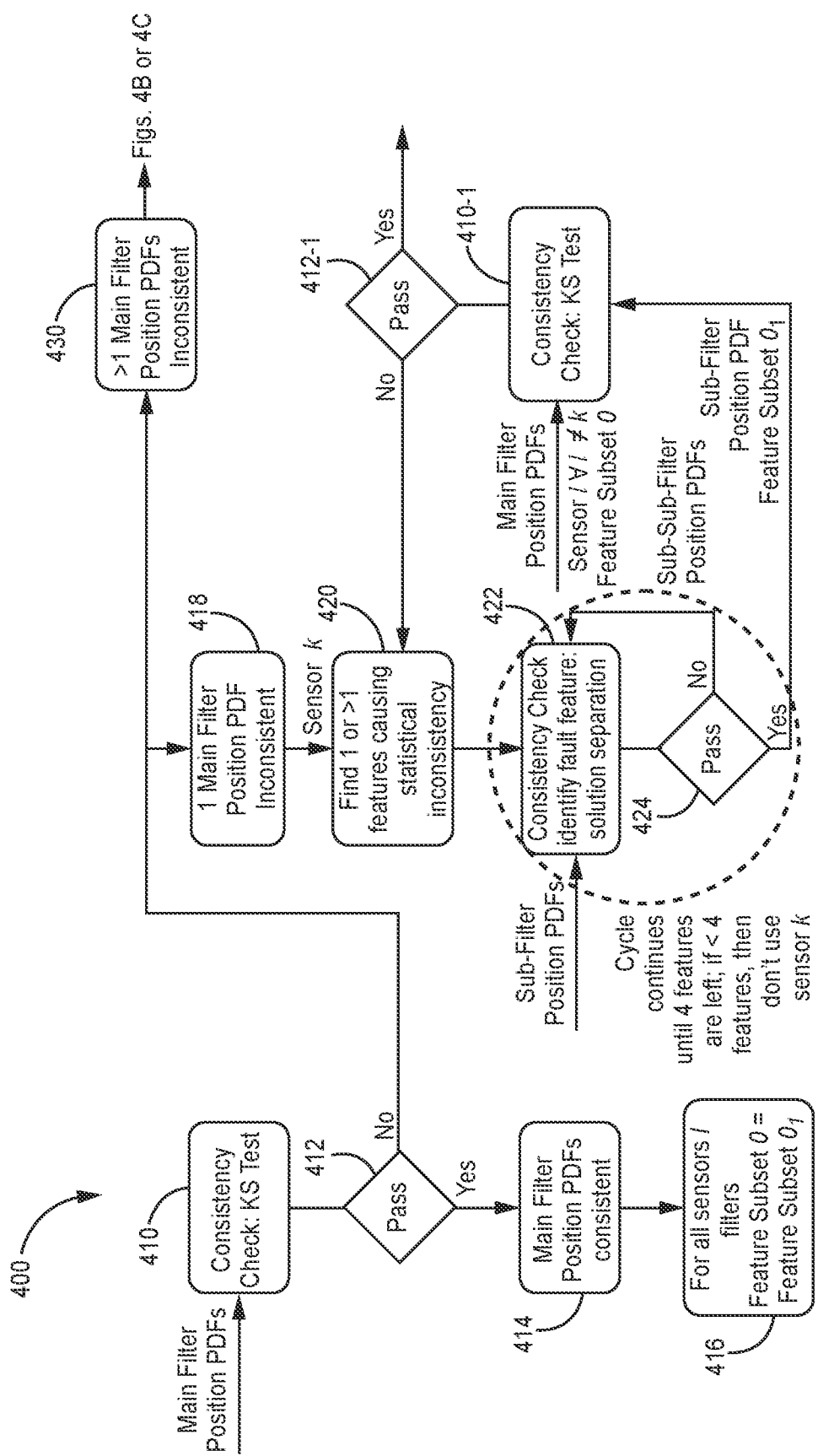
FIGS. 4A-4C are flow diagrams of an example operational method for a first level consistency monitor, such as employed in the navigation system architecture of FIG. 1.
Figure 4B:
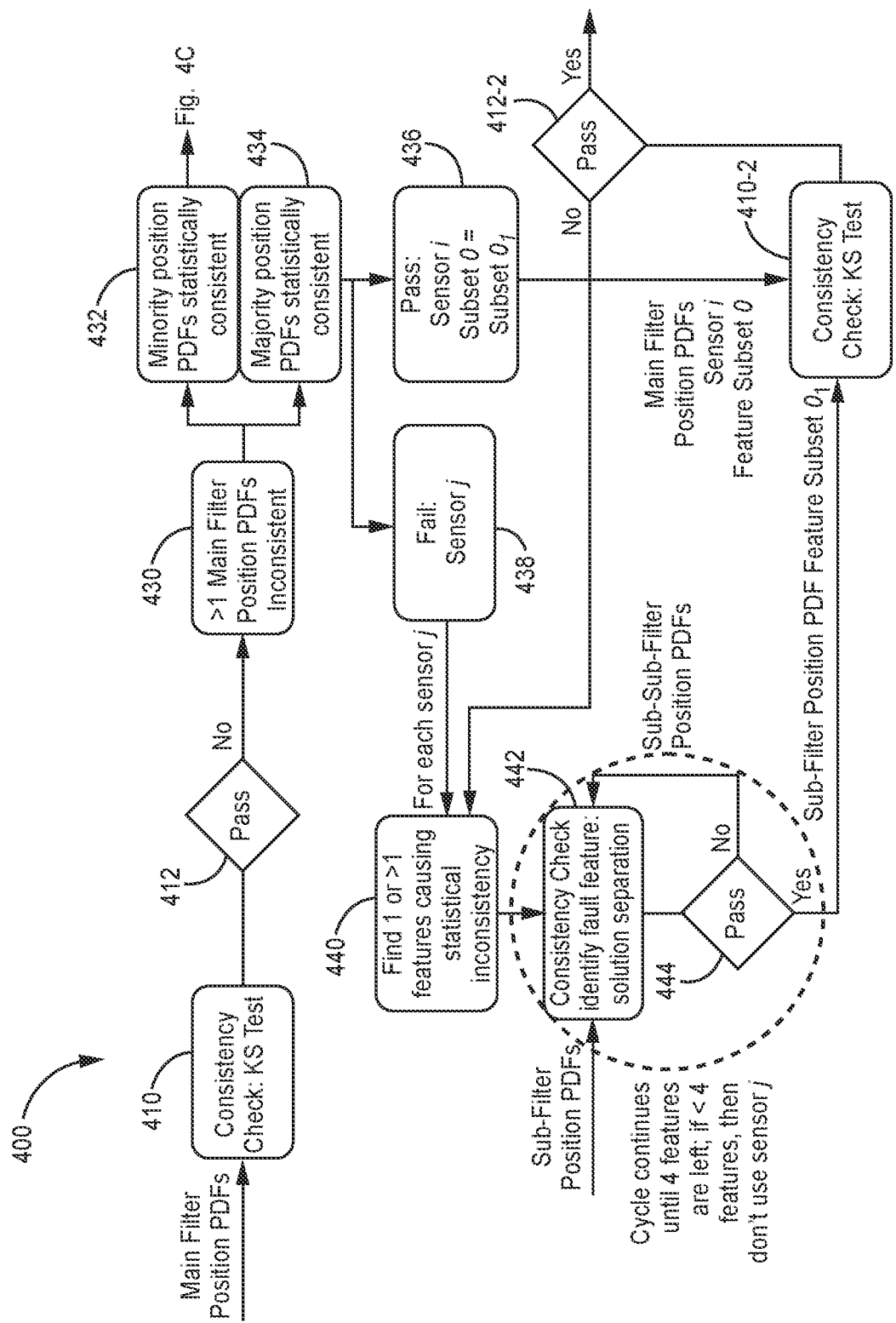
Figure 4C:
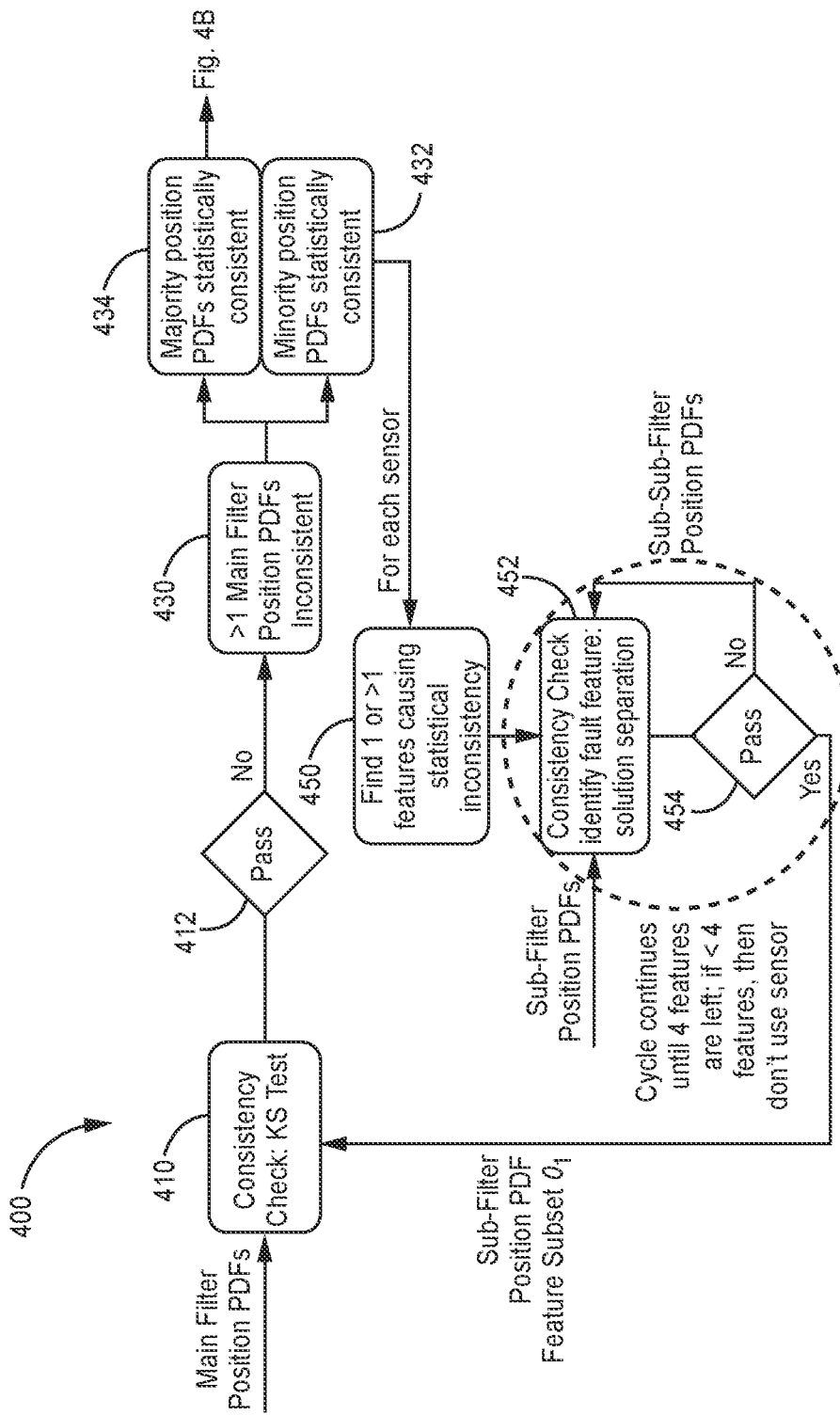

FIGS. 4A-4C are flow diagrams of an example operational method 400 for the first level consistency monitor. As shown in FIG. 4A, a consistency check is performed on the main filter position PDFs using the Kolmogorov-Smirnov (KS) test (block 410). If the main filter position PDFs pass the KS test (block 412), the main filter position PDFs are considered to be statistically consistent (block 414). In this case, for all sensors/filters, feature subset O=feature subset $O_1$ (block 416).

If the main filter position PDFs fail the KS test (block 412), and one main filter, filter k, position PDF is inconsistent (block 418), then for the corresponding sensor k, the consistency monitor finds one feature or greater than one features causing the statistical inconsistency (block 420). This is done by performing a consistency check on the sub-filter position PDFs to identify the faulty feature(s), using a solution separation technique (block 422). If all the sub-filter position PDFs fail the conditions of the consistency check (block 424), then method 400 returns to block 422 to repeat this consistency check using the sub-sub-filter position PDFs. This repeating cycle continues until four non-collinear features are left; if there are less than 4 non-collinear features, then sensor k is not used. If one of the sub-filter position PDFs pass the conditions of the consistency check (block 424), then a sub-filter position PDF feature subset $O_1$ is sent to block 410-1, where the consistency check using the KS test is performed. This consistency check is performed using main filter position PDFs for all the other sensors l∀l≠k, with feature subset O. If the main filter and sub-filter position PDFs pass the KS test (block 412-1), then the main filter and sub-filter position PDFs are considered to be statistically consistent, and are output to the second level filter sets. If the main filter and sub-filter position PDFs fail the KS test here, then method 400 returns to block 420 and repeats the above steps.

Returning to blocks 410 and 412, if the main filter position PDFs fail the KS test (block 412), and greater than one main filter position PDFs are inconsistent (block 430), then method 400 continues as shown in the flow diagrams of FIG. 4B or 4C. At this point, method 400 considers that either the minority of main filter position PDFs are statistically consistent (block 432) or the majority of main filter position PDFs are statistically consistent (block 434). If the minority of main filter position PDFs are statistically consistent (block 432), then method 400 continues as shown in FIG. 4C (described below). If the majority of main filter position PDFs are statistically consistent (block 434), then method 400 continues as shown in FIG. 4B, where for the corresponding sensors i, subset O=subset $O_1$ (pass, block 436).

As depicted in FIG. 4B, for the main filter position PDFs and corresponding sensors j that fail the consistency test (block 438), the consistency monitor finds one feature or greater than one features that are causing the statistical inconsistency (block 440). This is done by performing a consistency check on the sub-filter position PDFs to identify the faulty feature(s), using a solution separation technique (block 442). If the sub-filter position PDFs fail this consistency check (block 444), then method 400 returns to block 442 to repeat this consistency check using sub-sub-filter position PDFs. This repeating cycle continues until four non-collinear features are left; if there are less than four non-collinear features, then sensor j is not used. If the sub-filter position PDF passes the conditions of the consistency check (block 444), then a sub-filter position PDF feature subset $O_1$ is sent to block 410-2, where the consistency check using the KS test is performed. The consistency check here is also performed on main filter position PDFs for sensor i with feature subset O. If the main filter and sub-filter position PDFs pass the KS test (block 412-2), then the main filter and sub-filter position PDFs are considered to be statistically consistent, and are output to the second level filter sets. If the main filter and sub-filter position PDFs fail the KS test here, then method 400 returns to block 440 and repeats the above steps.

Returning again to blocks 410 and 412, if the main filter position PDFs fail the KS test, greater than one main filter position PDFs are inconsistent (block 430), and a minority of the main filter position PDFs are statistically consistent (block 432), then method 400 proceeds as shown in the flow diagram of FIG. 4C. For each sensor, the consistency monitor finds one feature or greater than one features that are causing the statistical inconsistency (block 450). This is done by performing a consistency check on the sub-filter position PDFs to identify the faulty feature(s), using a solution separation technique (block 452). If the sub-filter position PDFs fail this consistency check (block 454), then method 400 returns to block 452 to repeat this consistency check using sub-sub-filter position PDFs. This repeating cycle continues until four non-collinear features are left; if there are less than four non-collinear features, then the sensor is not used. If the sub-filter position PDFs pass this consistency check (block 454), then a sub-filter position PDF feature subset $O_1$ is sent back to the first consistency check that performs the KS test (block 410).

FIGS. 5A-5D illustrate an example test sequence using the first level consistency monitor. In a first step, from the main position PDF filters, the consistency monitor computes all combinations of discriminators:

$D_{i,j}$∀i=all sensors, all $N_O$ features;

j=all sensors, all $N_O$ features; i≠j.

Figure 5A:
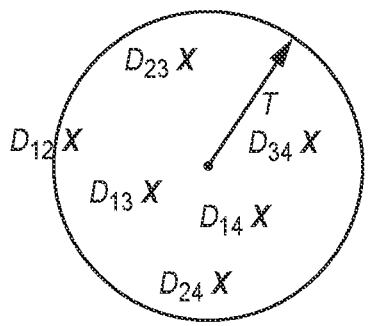
FIGS. 5A-5D illustrate an example test sequence using a first level consistency monitor.

In a second step, the consistency monitor checks whether $D_{ij} \leq T \forall i,j$. If the consistency check is true, then all PDFs are statistically equivalent; feature set $N_O$ provides statistically equivalent PDFs, with subset O; and all sensors are operating correctly. FIG. 5A illustrates an example of this situation, where: $D_{ij} \equiv X$ (using four sensors). As shown in FIG. 5A, all the discriminators ($D_{ij}$) are within the threshold (T). If the consistency check is untrue, then all PDFs are not statistically equivalent, and there are three possibilities: (a) at the sensor level, an incorrect feature data association is causing an inconsistent position PDF; (b) features in subset O are unobserved; and (c) one or more sensors are not operating correctly.

Figure 5B:
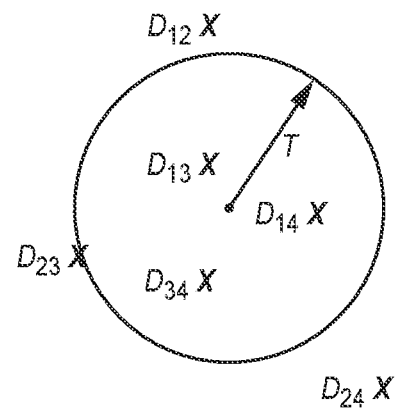

In a third step, if the position PDF output by one sensor fails the consistency check→sensor k, then at least one discriminator $D_{kj} \forall j \neq k$ will exceed the threshold. FIG. 5B illustrates an example of this situation, where the second sensor (sensor 2) provides an inconsistent position PDF. As shown in FIG. 5B, discriminator $D_{12}$ is outside the threshold (T). The consistency monitor determines whether there is/are (a) one feature or (b) multiple features causing the inconsistency or inconsistencies in the position PDF computed from sensor k. The consistency monitor computes discriminators using position PDFs computed from the sub-position PDF filters of sensor k and the position PDF computed from the main position PDF filter for sensor k:

$D_{io} \forall i \equiv 1$, $N_O$ sub-Position PDF Filters of sensor k.

The consistency monitor compares the discriminators to the threshold to check whether $D_{io} \leq T \forall i$.

Figure 5C:
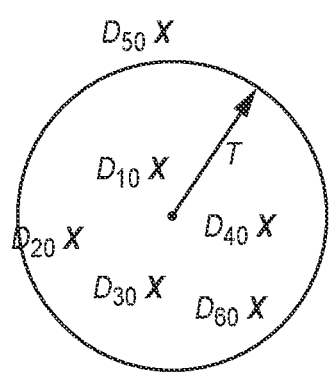

In a first sub-step (a) of the third step, if one feature is causing the inconsistent position PDF→feature q, then the sub-position PDF filter that operates without feature q will estimate a statistically inconsistent position PDF as compared to the main filter position PDF and the other sub-filter position PDFs. For sensor k, the consistency monitor uses this sub-position PDF filter as the main filter going forward. Also for sensor k, the consistency monitor forms feature subset $O_1$ that includes $N_O-1$ features and excludes feature q. These are compared to the main filter position PDFs from other sensors/position PDF filters to confirm statistical consistency. If not statistically equivalent, then the sensor is not used at the current measurement epoch. FIG. 5C illustrates an example with six features, where the fifth sub-filter (sub-filter 5) is inconsistent and the fifth feature (feature 5) is causing statistically inconsistent position PDFs: $N_O=5=\{1,2,3,4,6\}$. In this case, sub-filter 5 is promoted to the main filter for the sensor and the consistency monitor (block 410-1, FIG. 4A) compares the position PDF computed by sub-filter 5 to the position PDFs computed by the other main filters to confirm its statistical consistency.

Figure 5D:
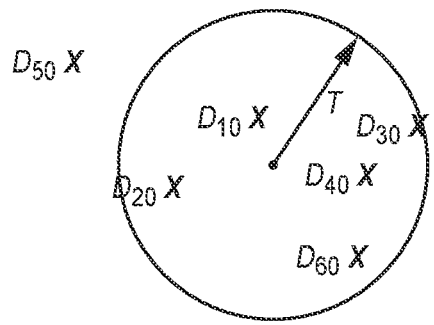

In a second sub-step (b) of the third step, if two or more features are causing the inconsistent position PDF from sensor k, then position PDFs from multiple sub-filters will both pass and fail the consistency test. In this case, every sub-filter uses a feature set that contains at least one feature that leads to inconsistent PDFs. The consistency monitor now searches for a set of features, $O_1$, that will enable a sub-filter of sensor k to provide inconsistent position PDFs with its parent filter and is then consistent with the position PDFs computed using the other main filters. The process given above in sub-step (a) is then repeated, but each sub-filter is considered as the main filter, the sub-sub-filters are used as the sub-filters, and the statistical consistency is assessed between the sub-filter computed position PDF and the sub-sub-filters computed position PDFs. FIG. 5D illustrates an example with six features, where two discriminators between the main filter position PDF and sub-filter position PDFs for sensor k exceed the threshold.

If position PDFs are statistically consistent between the main filter and sub-filters, then the feature(s) causing inconsistent PDFs have not been identified. If one position PDF is statistically inconsistent between the main filter and sub-filter, then feature(s) not used in the sub-filter is/are the feature(s) causing the inconsistent position PDFs. The consistency monitor (block 410-2, FIG. 4B) confirms the statistical consistency with position PDFs of other sensors.

This process continues using feature subsets until only four non-collinear features remain. If no combination of features enables position PDFs to pass the consistency test, then that sensor is not used during the measurement epoch. Note that four non-collinear features is a user selected number of minimum features; one feature from the vision sensor image and the pre-existing map are required over two consecutive measurement epochs to estimate the vehicle's two-dimensional (2D) position and 2D velocity relative to the map.

In a fourth step, if more than one sensor fails the consistency check and a majority of position PDFs from main position PDF filters are statistically consistent, then the consistency monitor follows the procedure for the third step described above for main position PDF filters and position PDFs that are statistically inconsistent. A feature subset $O_1$ is identified that enables the position PDF to be statistically consistent with the majority of main filter position PDFs. The consistency monitor compares the position PDF computed by the main filter to position PDFs computed by the sub-filters, by comparing any inconsistent position PDF computed from a sub-filter to the majority of position PDFs computed from other filters. If the position PDF computed by the sub-filter passes the test, then the sub-filter is promoted to a main filter and feature subset $O_1$ is used by the filter going forward. If a feature subset cannot be identified, then the sensor is not used at the current measurement epoch.

Again, if more than one sensor fails the consistency check and a minority of position PDFs from main position PDF filters are statistically consistent, then the following procedure is performed for one of or more features causing statistical inconstancies between main filter position PDFs. In this situation, there is a need to identify the feature(s) causing the statistical inconsistencies. Within each filter set, the consistency monitor compares position PDFs computed using sub-position PDF filters to position PDFs computed using main position PDF filters for statistical equivalency. If a majority of filter sets identify the same feature as causing statistical inconsistency, then that feature is dropped from feature set O, the sub-filters without that filter are promoted to the main filter in each filter set, and the statistical consistency tests begins again at the first step described above. If a majority of filter sets do not identify the same feature as causing statistical inconsistencies, then the sub-sub-position PDF filters are used to find features that cause statistical inconsistencies. The process repeats itself until only four non-collinear features are left. If a feature subset cannot be identified, then no sensors are used at the current measurement epoch.

Second Level Filter Sets and Consistency Monitors

The second level filter sets and consistency monitors are operative to: estimate, for each sensor/filter set k, the vehicle's kinematic state statistics using subset $O_1$ and additional features in subset $B_k$; refine the statistically consistent position PDFs computed using subset $O_1$ using additional features in subset $B_k$; and assure that the additional features in subset $B_k$ maintain the statistical consistency of position PDFs assured by the first level consistency monitor.

The second level position PDF filter sets include nonlinear filters such as Fokker Planck filters, which estimate the position PDF using feature subset $O_1$ and subset $B_k$. Since subset $B_k$ has more features than subset $O_1$, the estimated vehicle kinematic state statistics will likely have smaller errors than the statistics computed using subset $O_1$. For each sensor, verified features are used from subset $O_1$ plus features in subset $B_k$.

The second level filter sets are operative to estimate vehicle kinematic state statistics. A strapdown INS can be used to estimate vehicle position, velocity, and three-dimensional (3D) angular orientation using IMU measurements. A Bayesian filter can be used to provide a prediction step, which propagates vehicle kinematic error state statistics forward in time; and a correction step, which corrects predicted vehicle kinematic error state statistics using position PDFs. Depending on filter type, measurement statistics are extracted from position PDFs. The Bayesian filter corrections are used to correct the estimated vehicle position, velocity, and 3D angular orientation statistics computed using IMU measurements in the strapdown INS.

Figure 6A:
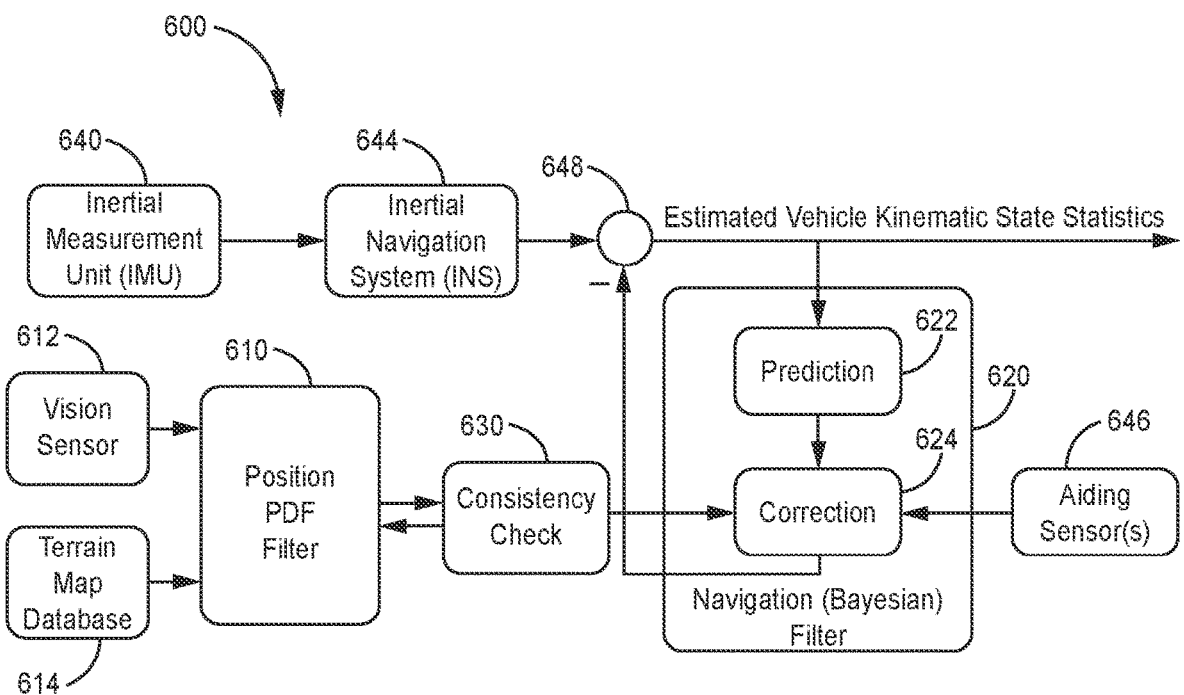
FIGS. 6A and 6B are block diagrams of a portion of a navigation system, which shows an exemplary implementation of a second level filter set and consistency monitor, such as used in the navigation system architecture of FIG. 1.
Figure 6B:
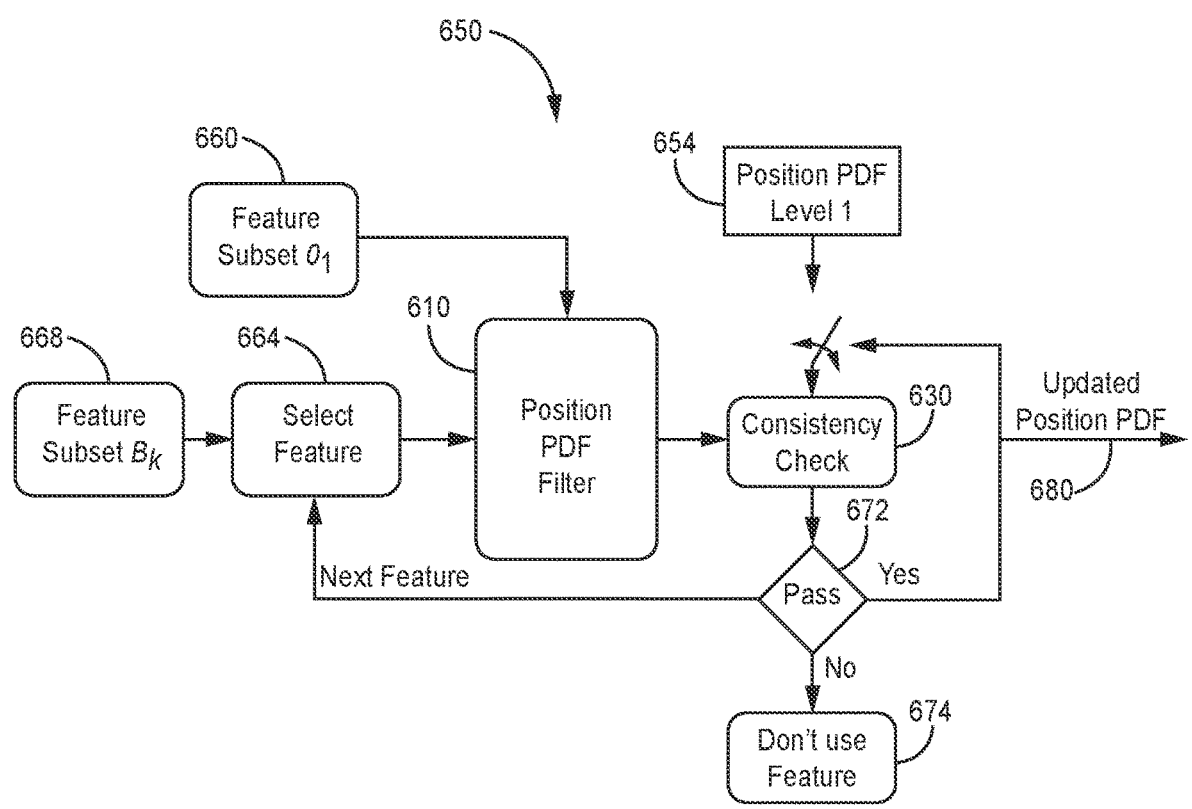

FIGS. 6A and 6B are block diagrams of a portion of a navigation system 600 for a vehicle, which shows an exemplary implementation of a second level filter set and consistency monitor. As shown in FIG. 6A, the second level filter set is implemented with a position PDF filter 610, and a navigation filter 620 such as a Bayesian filter, operatively coupled to position PDF filter 610. The second level consistency monitor is implemented with a consistency check module 630, which operatively communicates with position PDF filter 610 and navigation filter 620.

The position PDF filter 610 is operative to receive image data from a vision sensor 612, and map data from a terrain map database 614. The position PDF filter 610 is operative to generate statistics of the position and angular orientation of the vehicle, based on correlation of the image data and map data. The statistics of the position PDF computed by the position PDF filter 610 include the mean and variance of the image/map correlation and the real-time errors of the position and angular orientation measurements. A non-linear filter such as the Fokker-Planck filter can be used to estimate a position PDF from a convolution of a PDF of the image features and a PDF of the map features.

The statistics generated by position PDF filter 610 are sent to consistency check module 630 to perform the second level consistency check, which is described in further detail hereafter with respect to FIG. 6B. The consistency check module 630 outputs an updated position PDF to navigation filter 620. The navigation filter 620 fuses the updated position PDF with measurements from other sensors, to estimate the vehicle's position and angular orientation relative to the terrain map. These other sensors include an IMU 640 operative to produce inertial measurements that are sent to an inertial navigation system (INS) 644, such as a strapdown INS, which is operatively coupled to navigation filter 620. In addition, the other sensors can include one or more onboard aiding sensors 646 operatively coupled to navigation filter 620. Examples of aiding sensors 646 include a magnetometer, a GNSS receiver, a barometer, or the like.

The navigation filter 620 includes a prediction module 622, and a correction module 624 configured to receive an output from prediction module 622. The prediction module 622 is configured to receive estimated vehicle kinematic state statistics (including position, velocity, and angular orientation) produced by INS 644. The INS 644 is configured to generate the estimated vehicle kinematic state statistics based on integration of the inertial measurements from IMU 640. However, errors can occur when the inertial measurements are integrated by INS 644, due to IMU 640 measurement errors. The statistics generated by position PDF filter 610 are used by navigation filter 620 to compute errors in the estimated vehicle kinematic state statistics.

The prediction module 622 is operative to predict a state error vector PDF of the estimated vehicle kinematic state statistics. The correction module 624 receives the predicted state error vector PDF from prediction module 622. The correction module 624 also receives the updated position PDF from consistency check module 630.

The correction module 624 is configured to generate an error correction signal based on the various received inputs. The error correction signal is sent from correction module 624 to an input of a subtractor 648, which also configured to receive an output signal from INS 644. The differential between the signals from correction module 624 and INS 644 is output from subtractor 648 as updated estimated vehicle kinematic state statistics. These updated statistics are sent to the third level filter set (described further hereafter), and also fed back to navigation filter 620 for further processing.

FIG. 6B illustrates an example operational method 650 of a second level consistency monitor of navigation system 600. A first level (level 1) position PDF (block 654) is input to the second level consistency monitor to initialize the procedure outlined in FIG. 6B, since this position PDF is computed using the original feature subset $O_1$. In a first step, method 650 starts with feature subset $O_1$ (block 660), which is fed to position PDF filter 610 to compute a corresponding position PDF. At this point, method 650 refers to feature subset $O_1$ as feature subset $O_2$. In a second step, method 650 selects a new feature (block 664) from a feature subset $B_k$ (block 668). In a third step, method 650 computes a position PDF using the new feature from feature subset $B_k$ and feature subset $O_2$. In a fourth step, a consistency check (KS test) is performed by consistency check module 630 to compare the position PDF computed using a feature from subset $B_k$ and feature subset $O_2$ with the position PDF computed from feature subset $O_2$. If the consistency test is passed (block 672), then a new feature from subset $B_k$ is kept and added to the feature subset $O_2$, and the corresponding position PDF computed from the selected feature from subset $B_k$ and feature subset $O_2$ is kept. If the consistency test is failed (block 672), then method 650 does not use the feature from subset $B_k$, and the position PDF computed from subset $B_k$ and feature subset $O_2$ is not used any further (block 674). The method 650 then returns to the second step to select a next feature (block 664) from feature subset $B_k$ (block 668), and repeats the steps thereafter until all features in feature subset $B_k$ are exhausted. The method 650 then outputs an updated position PDF 680 for further processing.

Third Level Filters and Integrity Monitors

The third level filters and integrity monitors are operative to fuse outputs of the second level filter sets and consistency monitors to provide one final estimate of the vehicle kinematic state statistics, and assure the integrity of the final estimate of the vehicle kinematic state statistics. Also, protection levels of the vehicle kinematic states are computed at this stage.

Returning to FIG. 1, the third level filters and integrity monitor includes fusion filter 132 and integrity check monitor 134 operatively coupled to fusion filter 132. The fusion filter 132 is operative to receive vehicle kinematics state statistics (for k=1, $N_k$) from the second level filter sets and consistency monitors.

The fusion filter is a Bayesian filter selected to fuse the statistics of the vehicle kinematic states and not lose statistical information from the second level filters. For example, if the second level filters are Kalman filters, then the fusion filter can be selected as a Kalman filter. If the second level filters are higher order filters, then the fusion filter can be selected as a higher order filter (e.g., a particle filter).

The fusion filter provides a time update, for the vehicle kinematic state statistics. The fusion filter also provides a measurement update using the second level outputs. When a Kalman filter is implemented for the fusion filter, state mean vectors and state covariance matrices are used. When a particle filter is implemented for the fusion filter, particle means are selected as the state mean vector; particle statistics are selected using distributions that match the statistics of the outputs of the second level filters; and weights are, potentially, selected as the inverse of the estimated standard deviations of the vehicle kinematic state statistics estimated by the second level filters.

Figure 7:
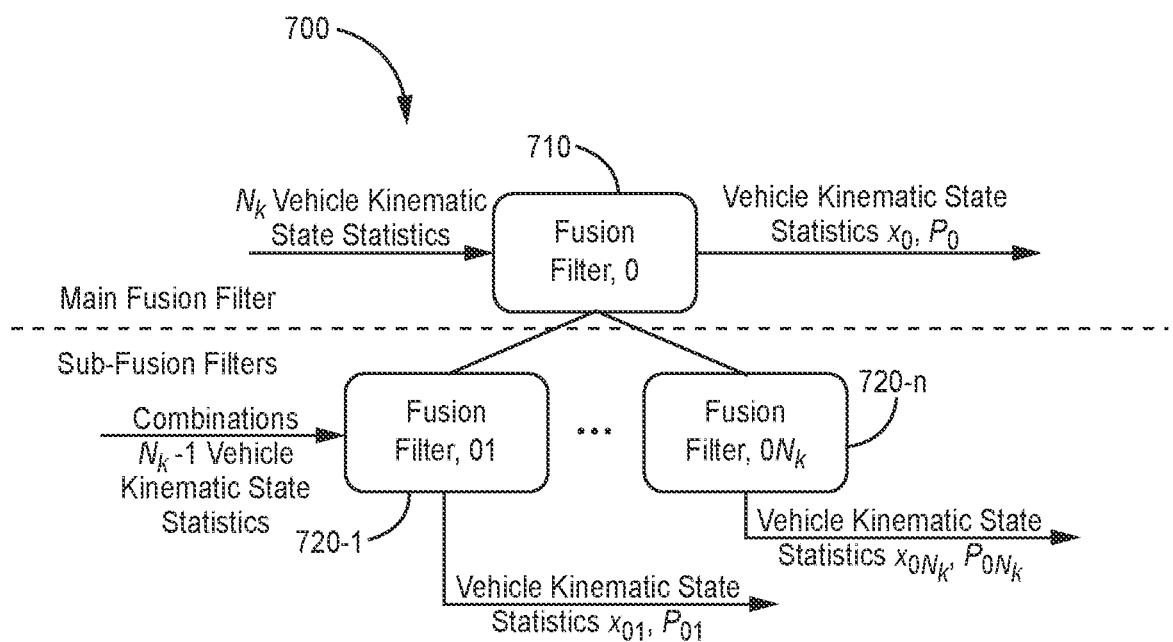
FIG. 7 is a block diagram of an example configuration for a third level filter set, which can be implemented in a fusion filter, such as employed in the navigation system architecture of FIG. 1.

FIG. 7 is a block diagram of an example configuration for a third level filter set 700, which can be implemented as the third level 130 of navigation system 100 (FIG. 1). The third level filter set 700 includes a main fusion filter (e.g., fusion filter 132, FIG. 1), and multiple sub-fusion filters (e.g., integrity check monitor 134, FIG. 1) of the main fusion filter. For example, the main fusion filter incudes a fusion filter, 0 (block 710), which is configured to receive $N_k$ vehicle kinematic state statistics output from the second level consistency monitors. The fusion filter, 0, is also configured to output vehicle kinematic state statistics $x_0$, $P_0$, where $x_0$ is the state mean vector and $P_0$ is the state covariance matrix. The sub-fusion filters include, for example, a fusion filter, 01 (block 720-1), and one or more additional filters including a fusion filter, $0N_k$ (block 720-n). Each sub-fusion filter is configured to receive combinations of $N_k-1$ vehicle kinematic state statistics. The fusion filter, 01, is configured to output vehicle kinematic state statistics $x_{01}$, $P_{01}$. The fusion filter, $0N_k$, is configured to output vehicle kinematic state statistics $x_{0N_k}$, $P_{0N_k}$.

Third Level Discriminators and Thresholds

The discriminator is defined as the distance between main filter kinematics states and sub-filter kinematic states:

$$dx_{0n} = x_{00} - x_{0n}$$

$$d_{0n} = \|dx_{0n}\|_2$$

The threshold is defined from a separation covariance matrix, $dP_{0n}$:

$$dP_{0n} = $$
$$E[\delta x_{0n} \delta x_{0n}^T] = E[(\delta x_{00} - \delta x_{0n})(\delta x_{00} - \delta x_{0n})^T] = E[\delta x_{00} \delta x_{00}^T] - E[\delta x_{00} \delta x_{0n}^T] -$$
$$E[\delta x_{0n} \delta x_{00}^T] + E[\delta x_{0n} \delta x_{0n}^T] = P_{00} - P_{0n}^{cross} - (P_{0n}^{cross})^T + P_{0n};$$

$P_{0n}^{cross} \equiv$ covariance between main filter and sub-filters.

The decision threshold, $D_{0n}$, is computed using the separation covariance matrix:

$$D_{0n} = K_{FA} \sqrt{\lambda^{dP_{0n}}}$$

where:
$P_{FA}$=probability of false alert per independent sample;
$\lambda^{dP_{0n}}$=maximum eigenvalue of the separation covariance matrix;
$K_{FA}$=false alert coefficient.

An alarm is raised to the system about a fault if the following holds:

$$d_{0n} > D_{0n}$$

The probability of false alert, $P_{FA}$, is typically derived from the continuity requirement. The false alert coefficient, $K_{FA}$ is defined as:

$$K_{FA} = Q^{-1}\left(\frac{P_{FA}}{2N}\right)$$

$$Q(x) = \int_x^\infty e^{-u^2/2} du.$$

Protection Levels

The protection level is computed as follows:

$$PL_{0n} = D_{0n} + a_{0n}$$

where $a_{0n}$ incorporates the covariance matrix of the sub-filter and the probability of missed detection, $P_{MD}$.

The uncertainty effect of the sub-filter is:

$$a_{0n} = K_{MD}\sqrt{\lambda^{P_{0n}}}$$

where:
$\lambda^{P_{0n}}$ ≡maximum eigenvalue of the sub-filter covariance matrix; and
$K_{MD}$ ≡missed detection coefficient.

The probability of missed detection, $P_{MD}$, is derived from the integrity requirement, the probability of hazardous misleading information, $P_{HMI}$. The missed detection coefficient, $K_{MD}$, is defined as:

$$K_{MD} = Q^{-1}(P_{MD})$$

$$Q(x) = \int_x^\infty e^{-u^2/2} du.$$

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a system for integrity monitoring, the system comprising: a processor onboard a vehicle; a terrain map database onboard the vehicle and operatively coupled to the processor; a plurality of vision sensors onboard the vehicle and operatively coupled to the processor, wherein each of the vision sensors have an overlapping field of view (FOV) with at least one of the other vision sensors; and one or more inertial sensors onboard the vehicle and operatively coupled to the processor; wherein the processor includes a processing unit operative to perform integrity monitoring of kinematic states of the vehicle, the processing unit comprising: a plurality of first level filter sets, wherein each first level filter set includes multiple position probability density function (PDF) filters, wherein each first level filter set is operative to: receive image data of the overlapping FOV from a respective vision sensor of the plurality of vision sensors, the image data corresponding to one or more terrain images of a given area; receive map data from the terrain map database, the map data corresponding to one or more terrain maps of the given area; identify one or more terrain features in the image data of the overlapping FOV and in the map data; and estimate a position PDF for the vehicle using the one or more terrain features; a first level consistency monitor operatively coupled to each of the first level filter sets, the first level consistency monitor operative to: receive the estimated position PDF from each of the first level filter sets; and determine a set of features, within the overlapping FOV of each visual sensor, which assure that the estimated position PDFs are statistically consistent with each other; a plurality of second level filter sets, wherein each second level filter set includes multiple position PDF filters and a navigation filter, wherein each second level filter set is operative to: receive, from the consistency monitor, the estimated position PDFs that are statistically consistent with each other; receive the map data from the terrain map database; receive inertial data from the one or more inertial sensors; receive image data from the respective vision sensor that includes one or more terrain features not in the overlapping FOV; and estimate kinematic state statistics for the vehicle based on the received data and the position PDFs that are statistically consistent; a plurality of second level consistency check modules that are each operatively coupled to a respective one of the second level filter sets, each second level consistency check module operative to: receive the estimated kinematic state statistics from the respective one of the second level filter sets; and assure consistency of the estimated kinematic state statistics; a third level fusion filter operatively coupled to each of the second level consistency check modules, the third level fusion filter operative to: combine the estimated kinematic state statistics from each of the second level consistency check modules; and compute a final estimate of the kinematic state statistics of the vehicle; and a third level integrity monitor operatively coupled to the third level fusion filter, the third level integrity monitor operative to: assure integrity of the final estimate of the kinematic state statistics; and compute protection levels for kinematic states of the vehicle.

Example 2 includes the system of Example 1, wherein the vision sensors include two or more categories of vision sensors comprising electro-optical cameras, infra-red cameras, light detection and ranging (LiDAR) sensors, or radar sensors.

Example 3 includes the system of any of Examples 1-2, wherein the one or more inertial sensors include at least one inertial measurement unit (IMU).

Example 4 includes the system of any of Examples 1-3, wherein the position PDF filters in each first level filter set include non-linear filters comprising Fokker-Planck filters.

Example 5 includes the system of any of Examples 1-4, wherein the position PDF filters in each first level filter set perform a correlation between image features in the image data and map features in the map data, to estimate a position of the vehicle relative to the terrain map.

Example 6 includes the system of any of Examples 1-5, wherein the position PDF filters in each first level filter set comprise: a main position PDF filter; multiple sub-position PDF filters from the main position PDF filter; and multiple sub-sub-position PDF filters from each of the sub-position PDF filters.

Example 7 includes the system of any of Examples 1-6, wherein the first level consistency monitor determines the set of features from a first feature subset, which are verified as leading to statistically equivalent position PDFs by all first level filter sets.

Example 8 includes the system of Example 7, wherein the statistically equivalent position PDFs are found using a Kolmogorov-Smirnov test to compare cumulative distribution functions (CDFs) of two arbitrary position PDFs.

Example 9 includes the system of Example 8, wherein the statistically equivalent position PDFs are found by comparing the position PDF computed by each position PDF filter using all features in the first feature subset.

Example 10 includes the system of Example 9, wherein if the first level consistency monitor determines that one or more position PDFs from the main position PDF filter are not statistically consistent, then the first level consistency monitor finds a position PDF computed within each first level filter set that is statistically equivalent by, sequentially dropping one feature from the remaining feature set, and comparing the resulting position PDFs to determine their statistical consistency.

Example 11 includes the system of any of Examples 6-10, wherein the first level consistency monitor performs a consistency check of the estimated position PDFs from each of the position PDF filters in the first level filter sets; and wherein the main position PDF filters operate on all features, and the sub-position PDF filters operate on a subset of features.

Example 12 includes the system of Example 11, wherein the consistency check is operative to: compute a discriminator using the Kolmogorov-Smirnov test for the estimated position PDFs from each main position PDF filter; select a threshold; and determine whether the discriminator is less than or equal to the threshold.

Example 13 includes the system of any of Examples 1-12, wherein the position PDF filters in each second level filter set include non-linear filters comprising Fokker-Planck filters.

Example 14 includes the system of any of Examples 1-13, wherein each second level consistency check module operatively communicates with a respective position PDF filter and navigation filter in each second level filter set.

Example 15 includes the system of any of Examples 1-14, further comprising: an inertial navigation system (INS) operatively coupled to the navigation filter in each second level filter set; wherein the INS is operative to receive inertial data from the one or more inertial sensors, and generate estimated vehicle kinematic state statistics.

Example 16 includes the system of Example 15, wherein the navigation filter in each second level filter set comprises a Bayesian filter including: a prediction module operative to receive the estimated vehicle kinematic state statistics; and a correction module configured to receive an output from the prediction module, and extracted statistics from a respective position PDF filter in the second level filter set; wherein the correction module is configured output a correction signal that is used to update the estimated vehicle kinematic state statistics.

Example 17 includes the system of Example 16, wherein the second level consistency check module outputs an updated position PDF to the correction module.

Example 18 includes the system of any of Examples 1-17, wherein the third level fusion filter comprises a Bayesian filter that includes: a main fusion filter configured to receive vehicle kinematic state statistics output from the second level consistency check modules; and multiple sub-fusion filters of the main fusion filter.

Example 19 includes the system of Example 18, wherein the third level integrity monitor is operative to: compute a discriminator, which is defined as a distance between main fusion filter kinematic states and sub-fusion filter kinematic states; select a threshold, which is defined from a separation covariance matrix; and determine whether the discriminator is greater than the threshold.

Example 20 includes the system of any of Examples 1-19, wherein the vehicle is an aircraft.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system for integrity monitoring, the system comprising:
    a processor onboard a vehicle;
    a terrain map database onboard the vehicle and operatively coupled to the processor;
    a plurality of vision sensors onboard the vehicle and operatively coupled to the processor, wherein each of the vision sensors have an overlapping field of view (FOV) with at least one of the other vision sensors; and
    one or more inertial sensors onboard the vehicle and operatively coupled to the processor;
    wherein the processor includes a processing unit operative to perform integrity monitoring of kinematic states of the vehicle, the processing unit comprising:
        a plurality of first level filter sets, wherein each first level filter set includes multiple position probability density function (PDF) filters, wherein each first level filter set is operative to:
            receive image data of the overlapping FOV from a respective vision sensor of the plurality of vision sensors, the image data corresponding to one or more terrain images of a given area;
            receive map data from the terrain map database, the map data corresponding to one or more terrain maps of the given area;
            identify one or more terrain features in the image data of the overlapping FOV and in the map data; and
            estimate a position PDF for the vehicle using the one or more terrain features;
        a first level consistency monitor operatively coupled to each of the first level filter sets, the first level consistency monitor operative to:
            receive the estimated position PDF from each of the first level filter sets; and
            determine a set of features, within the overlapping FOV of each visual sensor, which assure that the estimated position PDFs are statistically consistent with each other;
        a plurality of second level filter sets, wherein each second level filter set includes multiple position PDF filters and a navigation filter, wherein each second level filter set is operative to:
            receive, from the consistency monitor, the estimated position PDFs that are statistically consistent with each other;
            receive the map data from the terrain map database;
            receive inertial data from the one or more inertial sensors;
            receive image data from the respective vision sensor that includes one or more terrain features not in the overlapping FOV; and
            estimate kinematic state statistics for the vehicle based on the received data and the position PDFs that are statistically consistent;
        a plurality of second level consistency check modules that are each operatively coupled to a respective one of the second level filter sets, each second level consistency check module operative to:
            receive the estimated kinematic state statistics from the respective one of the second level filter sets; and
            assure consistency of the estimated kinematic state statistics;
        a third level fusion filter operatively coupled to each of the second level consistency check modules, the third level fusion filter operative to:
            combine the estimated kinematic state statistics from each of the second level consistency check modules; and
            compute a final estimate of the kinematic state statistics of the vehicle; and
        a third level integrity monitor operatively coupled to the third level fusion filter, the third level integrity monitor operative to:
            assure integrity of the final estimate of the kinematic state statistics; and
            compute protection levels for kinematic states of the vehicle.

2. The system of claim 1, wherein the vision sensors include two or more categories of vision sensors comprising electro-optical cameras, infra-red cameras, light detection and ranging (LiDAR) sensors, or radar sensors.

3. The system of claim 1, wherein the one or more inertial sensors include at least one inertial measurement unit (IMU).

4. The system of claim 1, wherein the position PDF filters in each first level filter set include non-linear filters comprising Fokker-Planck filters.

5. The system of claim 1, wherein the position PDF filters in each first level filter set perform a correlation between image features in the image data and map features in the map data, to estimate a position of the vehicle relative to the terrain map.

6. The system of claim 1, wherein the position PDF filters in each first level filter set comprise:
    a main position PDF filter;
    multiple sub-position PDF filters from the main position PDF filter; and
    multiple sub-sub-position PDF filters from each of the sub-position PDF filters.

7. The system of claim 6, wherein the first level consistency monitor determines the set of features from a first feature subset, which are verified as leading to statistically equivalent position PDFs by all first level filter sets.

8. The system of claim 7, wherein the statistically equivalent position PDFs are found using a Kolmogorov-Smirnov test to compare cumulative distribution functions (CDFs) of two arbitrary position PDFs.

9. The system of claim 8, wherein the statistically equivalent position PDFs are found by comparing the position PDF computed by each position PDF filter using all features in the first feature subset.

10. The system of claim 9, wherein if the first level consistency monitor determines that one or more position PDFs from the main position PDF filter are not statistically consistent, then the first level consistency monitor finds a position PDF computed within each first level filter set that is statistically equivalent by, sequentially dropping one feature from the remaining feature set, and comparing the resulting position PDFs to determine their statistical consistency.

11. The system of claim 6, wherein the first level consistency monitor performs a consistency check of the estimated position PDFs from each of the position PDF filters in the first level filter sets; and
wherein the main position PDF filters operate on all features, and the sub-position PDF filters operate on a subset of features.

12. The system of claim 11, wherein the consistency check is operative to:
compute a discriminator using the Kolmogorov-Smirnov test for the estimated position PDFs from each main position PDF filter;
select a threshold; and
determine whether the discriminator is less than or equal to the threshold.

13. The system of claim 1, wherein the position PDF filters in each second level filter set include non-linear filters comprising Fokker-Planck filters.

14. The system of claim 1, wherein each second level consistency check module operatively communicates with a respective position PDF filter and navigation filter in each second level filter set.

15. The system of claim 1, further comprising:
an inertial navigation system (INS) operatively coupled to the navigation filter in each second level filter set;
wherein the INS is operative to receive inertial data from the one or more inertial sensors, and generate estimated vehicle kinematic state statistics.

16. The system of claim 15, wherein the navigation filter in each second level filter set comprises a Bayesian filter including:
a prediction module operative to receive the estimated vehicle kinematic state statistics; and
a correction module configured to receive an output from the prediction module, and extracted statistics from a respective position PDF filter in the second level filter set;
wherein the correction module is configured output a correction signal that is used to update the estimated vehicle kinematic state statistics.

17. The system of claim 16, wherein the second level consistency check module outputs an updated position PDF to the correction module.

18. The system of claim 1, wherein the third level fusion filter comprises a Bayesian filter that includes:
a main fusion filter configured to receive vehicle kinematic state statistics output from the second level consistency check modules; and
multiple sub-fusion filters of the main fusion filter.

19. The system of claim 18, wherein the third level integrity monitor is operative to:
compute a discriminator, which is defined as a distance between main fusion filter kinematic states and sub-fusion filter kinematic states;
select a threshold, which is defined from a separation covariance matrix; and
determine whether the discriminator is greater than the threshold.

20. The system of claim 1, wherein the vehicle is an aircraft.

* * * * *

UNITED STATES PATENT AND TRADEMARK OFFICE
CERTIFICATE OF CORRECTION

PATENT NO. : 11,835,341 B2
APPLICATION NO. : 17/380916
DATED : December 5, 2023
INVENTOR(S) : Bageshwar et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this
First Day of July, 2025

Coke Morgan Stewart
*Acting Director of the United States Patent and Trademark Office*